UNITED STATES PATENT OFFICE.

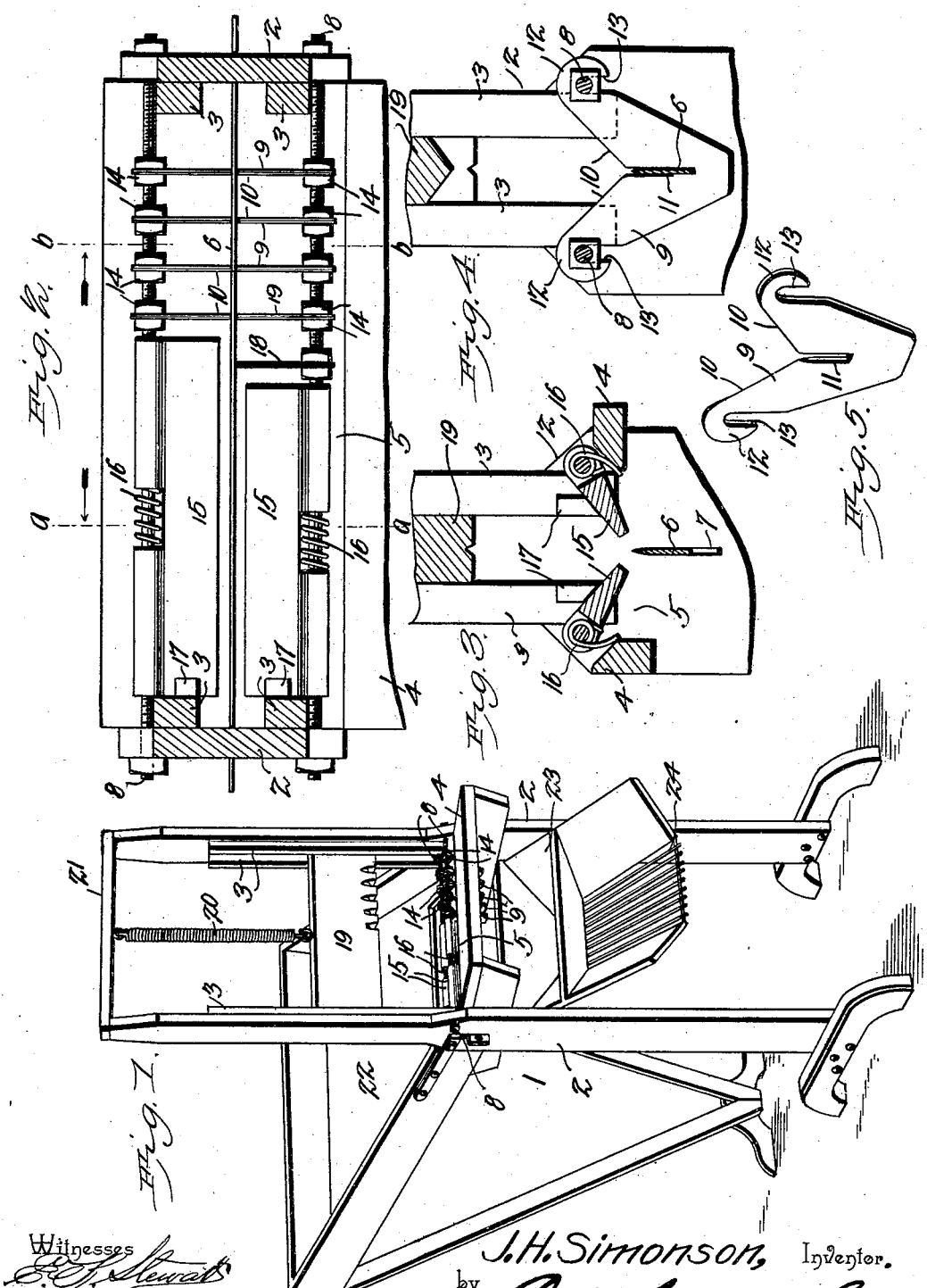

JOHN HARVEY SIMONSON, OF PRESQUE ISLE, MAINE.

SEED-POTATO CUTTER.

SPECIFICATION forming part of Letters Patent No. 713,249, dated November 11, 1902.

Application filed March 10, 1902. Serial No. 97,562. (No model.)

*To all whom it may concern:*

Be it known that I, JOHN HARVEY SIMONSON, a citizen of the United States, residing at Presque Isle, in the county of Aroostook and State of Maine, have invented a new and useful Seed-Potato Cutter, of which the following is a specification.

My invention is an improved machine adapted for cutting seed-potatoes into pieces of suitable size for planting; and it consists in the peculiar construction and combination of devices hereinafter fully set forth and claimed.

In the accompanying drawings, Figure 1 is a perspective view of a seed-potato-cutting machine embodying my improvements. Fig. 2 is a detail top plan view showing the relative arrangement of the cutting-knives and spring-pressed valves, being a horizontal section through the vertical guideways in which the ends of the presser-block operate. Fig. 3 is a vertical sectional view taken on a plane indicated by the line $a\ a$ of Fig. 2. Fig. 4 is a similar view taken on a plane indicated by the line $b\ b$ of Fig. 2. Fig. 5 is a detail perspective view of one of the cross-knives.

In the embodiment of my invention here shown I employ a gallows-frame 1, on the inner sides of the vertical studs or posts 2 of which in their upper portions are vertical guideways 3. A table 4 is disposed between the studs or posts 2 and suitably secured thereto and has an opening 5 extending across the same. A cutter-knife 6, which is disposed in a vertical plane so that its cutting edge is uppermost, is disposed longitudinally of and midway in the opening 5 and has its end portions secured in slots 7 in the posts 2. The said posts are connected together by screw-threaded rods 8, which are disposed at a slight distance above the table 4 and the sides of the opening 5 therein. I also employ a number of cutter-knives 9, which are disposed transversely with reference to the knife 6 and are of the form shown in Fig. 4, having V-shaped cutting edges 10 on their upper sides and vertical slots 11 in their central portions in which the knife 6 is disposed, the latter being notched on its lower side to receive the lower portions of said transverse cutters. The latter are here shown as formed with outstanding inclined arms 12, which have vertical slots 13 on their under sides near their outer ends, which slots engage the rods 8. On the latter are nuts 14, which serve to clamp the cross-knives to the rods 8 and to enable the said cross-knives to be adjusted so that they may be disposed at any desired distance apart. It will be observed by reference to Fig. 2 of the drawings that the cross-knives 9 are disposed in one end of the opening 5 in the table.

A pair of valves 15 are disposed in that portion of the opening 5 which is unoccupied by the cross-knives 9, and the said valves are on opposite sides of the longitudinal knife 6 and are pivoted on the rods 8. Springs 16, which are here shown as coiled springs disposed on the said rods 8, have their ends bearing, respectively, against the sides of the opening 5 and the outer sides of the valves 15, and said springs serve to normally support the said valves in such position as to close that portion of the opening 5 over which they are disposed and with the inner sides of the said valves above the upper cutting edge of the longitudinally-disposed knife 6. Suitable stops 17 coact with the springs 16 to maintain the said valves normally in this position, as shown in Fig. 3. One of the valves 15 is shorter than the other, and a cross-knife 18, which extends only half-way across the opening 5 and to one side of the knife 6, is disposed near the inner end of the shorter valve 15 and at a suitable distance from the proximate cross cutter-knife 9. The said cross-knife 18 is in form and construction the same as one-half of one of the cross cutters or knives 19.

A presser-block 19 is disposed above the knives or cutters, and its ends are disposed and adapted to operate in the vertical guideways 3, so that the said presser-block is adapted to be operated vertically between the upper portions of the posts or studs 2 above the cutters. A spring 20, which is here shown as a coiled retractile spring having one end connected to the cross-bar 21, which connects the upper ends of the studs or posts 2, and its lower end connected to the presser-block, normally elevates the latter. The potatoes to be cut are placed on the cross knives or cutters, if they are of considerable size, and the presser-block being then pressed downwardly by manual operation the potatoes are forced downwardly on the knives or cutters 6 9 and by them cut into pieces of suitable size for planting. If the potatoes are small and it is desired to only split them and cut them into two pieces, they are placed on the valves 15, and when forced downwardly by the presser-block said valves yield and the potatoes are by the cutter 6 divided longitudinally each into two pieces. If it be desired to cut a potato into three pieces, the same is placed above the cutter 6 and on the end portions of the valves 15, so that the inner cross-cutter 18 is under the center of the potato, as is indicated in dotted lines in Fig. 2, the potato when pressed downwardly by the presser-block being cut longitudinally into two pieces by the knife 6 and the said cross-cutter 18 subdividing one of the halves of the potato.

A suitable trough 22 may be provided, as shown in Fig. 1, to feed the potatoes by gravity to the cutters, and a suitable receptacle may be placed under the cutters to receive the divided portions of the potatoes as they drop from the cutters. In the embodiment of my invention here shown I have provided a hopper 23, which is disposed under the cutters, and on the lower side of the said hopper is a screen 24, having its bars sufficiently far apart to allow pieces of potato of suitable size for planting to pass between them, such pieces as are unnecessarily large being caught by the bars of the screen, so that they may be recut into suitable size.

I do not desire to limit myself to the precise construction and combination of devices herein shown and described, as it is evident that modifications may be made therein without departing from the spirit of my invention.

Having thus described my invention, I claim—

1. The combination of supporting-rods, cross-cutters connecting said rods together at one end, a longitudinally-disposed cutter lying in a vertical plane intermediate said rods and intersecting the cross-cutters, valves disposed in the spaces between said rods and that portion of the longitudinal cutter which projects beyond the cross-cutters, said valves being pivoted on said rods, and stops and springs to maintain said valves normally above the longitudinal cutter, substantially as described.

2. In a potato-cutter, the combination of vertical studs having vertical guideways, parallel rods connecting the studs together, cross-cutters disposed between and having downwardly-opening slots engaging the rods, whereby the cross-cutters are supported thereby removable therefrom and connect said rods together at one end, a longitudinally-disposed cutter-blade intersecting said cross-cutters and having its ends disposed in vertical slots in the studs and valves, pivoted on said rods, between them, above said longitudinal cutter, beyond the cross-cutters, and means to maintain said valves normally above said longitudinal cutter, substantially as described.

In testimony that I claim the foregoing as my own I have hereto affixed my signature in the presence of two witnesses.

JOHN HARVEY SIMONSON.

Witnesses:
M. D. COLBATH,
A. C. PERRY.